(12) United States Patent  
Swift

(10) Patent No.: US 6,983,827 B2  
(45) Date of Patent: Jan. 10, 2006

(54) "ON" BIASED BRAKING SYSTEM FOR A CARGO PORTAGE DEVICE

(76) Inventor: Edgar Leon Swift, 1596 Sandpoint Dr., Roswell, GA (US) 30075

( * ) Notice: Subject to any disclaimer, the term of this patent is extended or adjusted under 35 U.S.C. 154(b) by 0 days.

(21) Appl. No.: 10/779,831

(22) Filed: Feb. 17, 2004

(65) Prior Publication Data

US 2005/0178623 A1    Aug. 18, 2005

(51) Int. Cl.
*B26B 5/04*    (2006.01)

(52) U.S. Cl. .................. 188/19; 188/2 R; 280/47.31; 280/653

(58) Field of Classification Search .............. 188/19, 188/9, 10, 20, 73.1, 166, 2 R, 21, 22, 72.9; 280/47.31, 47.315, 653
See application file for complete search history.

(56) References Cited

U.S. PATENT DOCUMENTS

| | | | |
|---|---|---|---|
| 2,716,031 A * | 8/1955 | Roessler .................. 280/47.31 |
| 4,767,128 A | 8/1988 | Terhune | |
| 4,962,833 A * | 10/1990 | McCurdy .................... 188/2 R |
| 5,531,295 A * | 7/1996 | Kopman et al. .............. 188/21 |
| 6,148,963 A * | 11/2000 | Canfield, Jr. ............. 188/24.21 |
| 6,220,622 B1 | 4/2001 | Garcia | |
| 2003/0015852 A1 | 1/2003 | Swift | |
| 2003/0141686 A1 * | 7/2003 | Willis ..................... 280/47.34 |

* cited by examiner

*Primary Examiner*—Melody M. Burch

(57) ABSTRACT

A braking system for a cargo portage device, such as a wheelbarrow, that is biased in the "On" state to prevent the device from coasting away on its own when it is resting on an incline unattended by a user. This braking system enhances the safety of a device used by those who may be prone to forget to lock its brakes when it is left resting on an incline unattended or in situations in which children may have access to the device and use it as a wheeled toy. This braking system also enables the user of a wheelbarrow employing it to traverse obstacles, such as steps, logs, curbs, etc., within the wheelbarrow's path of travel and haul greater loads than can be realized using a conventional wheelbarrow.

3 Claims, 2 Drawing Sheets

"ON" BIASED BRAKING SYSTEM FOR A CARGO PORTAGE DEVICE

BACKGROUND

1. Field of the Invention

The present invention, in general relates to braking systems and braking methods for cargo portage devices and more particularly, to braking systems and braking methods for use with wheelbarrows comprising a cargo receptacle mounted to two handles that project forward beyond the front of the cargo receptacle and rearward beyond the rear of the cargo receptacle. The forward handle projections enable mounting at least one front wheel that facilitates movement of the device. The rear handle projections have hand grip ends that a user can grasp to raise or lower the rearward portion of the wheelbarrow to facilitate controlling the movement and direction of the device. To further describe such wheelbarrows, they usually have wheels or struts placed underneath and towards the rear of the cargo receptacle to enable the wheelbarrow to stand upright when it is at rest unsupported by a user.

Further, the handles of such wheelbarrows have a nominal length of approximately 60 inches and the rear, gripping ends of the handles rest at a nominal height of approximately 20 inches above the surface on which the wheelbarrow rests while unsupported by its user, and the nominal distance from the hand-grip ends of the handles to the point at which the rear support of the wheelbarrow sits on a surface is approximately 36 inches. These parameters have been mentioned to clearly distinguish the types of portage devices to which my present braking system applies from other cargo portage devices, such as carts of various designs. For descriptive purposes, the portage devices I have described will be referred to as "conventional" wheelbarrows throughout this patent application to assist in teaching what's different about the construction and method of using my present braking system for a cargo portage device.

2. Description of Prior Art

There is a multitude of designs of wheelbarrows known in the prior art. One commonality among conventional wheelbarrows is that, owing to the method by which they are used, they all typically have only one fulcrum of useful leverage. The advantage of this leverage is realized when the axle of the front wheel(s) is used as a fulcrum in conjunction with the user raising the rear ends of the handles of the wheelbarrow to lift its load for transporting.

Conventional wheelbarrows perform well when being pulled or pushed over a surface that has no obstructions of significant height, relative to the diameter of their front wheel(s), in their path of travel. Typical obstructions could be curbs, logs, stones or steps, for example. When a user pushing a conventional wheelbarrow confronts such an obstruction and can't move around it, he or she can sometimes traverse the obstruction by "ramming" into it with the front wheel(s) of the wheelbarrow and bouncing up over it if the obstruction is no more than about three inches high. This often leads to the wheelbarrow tipping over, causing it to spill its load. An equally devastating consequence can occur if the wheelbarrow is being used, in the manner just described, to transport fragile cargo over an obstruction even if the wheelbarrow doesn't tip over.

When a user of a conventional wheelbarrow determines that it is either unwise or impossible to push or ram the wheelbarrow over an obstruction, he or she will usually make the choice of turning the wheelbarrow around and pulling it up over the obstruction. When this becomes necessary, the user of such a wheelbarrow has to exert enough force to overcome two sources of resistance: 1) The obstruction that the user is trying to traverse with the wheelbarrow presents a virtually infinite source of resistance to progress of the wheelbarrow in the desired direction of travel, and 2) The force of gravity provides resistance working downwardly against the mass of the wheelbarrow and its cargo. Because of this, the user has to lift the weight of both the wheelbarrow and its cargo upward over the obstruction, while standing in a posture that is disadvantageous for lifting.

In the situations just mentioned, conventional wheelbarrows not only lose part of the utility of their valuable assets, they are also an impediment to their users, because their users have to exert enough upward force to haul the weight of both the wheelbarrow and its cargo over the obstruction without the advantage of leverage. It is only after a user has suffered the stress of exerting this unleveraged force to get the wheelbarrow over the obstruction that the advantages of such a wheelbarrow again become apparent.

Known conventional wheelbarrows have two fulcrums of leverage. The axle of the front wheel(s) is the fulcrum of leverage when the user lifts the rear of the wheelbarrow's handles in order to raise its load of cargo to the transporting position. This is useful leverage and is partly what has made the wheelbarrow the important tool that it is. Some conventional wheelbarrows have struts that are usually located underneath and towards the rear of the cargo receptacle. The second fulcrum of leverage for such wheelbarrows is constituted by the bottom of their struts. This leverage comes into play when the user pushes down on the rear of the wheelbarrow's handles causing the wheelbarrow's front end to rise. Although this leverage facilitates raising the front end of the wheelbarrow, it is usually useless leverage, because it removes the wheelbarrow's front wheel(s) off the surface and this puts it in a situation in which it can't be easily moved, thus impeding the transport of its load. The wheelbarrow can't be easily moved when in this position, because removing its front wheel(s) from the surface transfers the combined forces of the wheelbarrow's weight, the weight of its cargo and the force of the user pushing down onto the relatively immovable struts, which are usually going to be sitting on a surface that has a relatively high coefficient of sliding friction. Since wheelbarrows are designed to transport loads; employing the use of one or more wheels; either horizontally or up or down an incline, little value can be realized from using their leverage to move their front wheel(s) vertically off a surface.

A further limitation of strut-fitted conventional wheelbarrows is that they have no provisions for using them to move an extremely heavy load, such as when the weight of the load exceeds the load carrying capacity of the front wheel(s) or when more than one person is needed to use the wheelbarrow to move a load up a steep incline. Some wheelbarrow designers have attempted to overcome this limitation by adding wheels underneath and towards the rear of the cargo receptacle in place of the struts. Such attempts have often revealed other design shortcomings, such as the lack of adequate brakes that could prevent unwanted movement of the wheelbarrow.

Some examples of disadvantages resulting from the lack of adequate brakes in known conventional wheelbarrows of this type are: 1) Requiring that the device be pulled by a towing vehicle which would provide the braking; 2) having no brakes at all; and 3) brakes that either cannot be firmly locked in both the "On" and the "Off" positions or brakes that do not default to the "On" position without user intervention. This latter feature is an important safety feature for the common situations in which a user is likely to forget to lock the brakes or children are likely to use the wheelbarrow as a riding toy and roll it down an incline.

Although a variety of improvements and adaptations of wheelbarrow brakes are known, none include the novel combination of features or employ the method of use that would enable them to be used in the manner that will be described for the present wheelbarrow braking system and none of them singularity employ the embodiments that lend themselves to the use of my new methodology. My present wheelbarrow braking system and its method of use relies on applying a frictional force to the tread of wheels positioned underneath and towards the rear of the wheelbarrow's cargo receptacle. Wheelbarrows employing brake systems to wheels positioned underneath and towards the rear of the wheelbarrow's cargo receptacle are known in the prior art, but their design fails to enable those wheelbarrows to be used in the manner that wheelbarrows can be used when they are fitted with my present wheelbarrow braking system. I will mention three such inventions below, but it is to be understood that my mentioning them is solely for the purpose of objectively teaching how their designs fail to lend themselves to the use of my new method and not for the purpose of disparaging them.

The first two of those three inventions employ brakes that control the rotation of wheels mounted on swivel casters. In general, the operation of the braking system for my new method of use won't function properly on wheels mounted on swivel casters, since the wheels need to be mounted pointed in a fixed direction in a plane parallel to or coincident with the longitudinal centerline of the wheelbarrow on which my new brake system is installed.

One invention is U.S. Pat. No. 6,220,622 to Garcia, issued Apr. 24, 2001. This invention discloses the use of large swivel casters for its two rear wheels. It claims that the swivel feature of the casters is to be offset from the vertical centerline of the swivel's spindle so that the wheels can "trail", very much like offset casters on an office chair. While swivel casters may likely keep the wheelbarrow standing upright when all three of its wheels are on a resting surface, the wheelbarrow is likely to tip over if it is allowed to rest on only the two rear swivel casters in the manner that will be described for using the present invention. This is because the invention fails to teach how to provide for positioning the casters so that they simultaneously point in the same direction. This condition can be simulated by leaning an office chair back so that it rests on two of its casters, turning the toe of one caster in one direction, then turning the toe of the other caster in another direction and watching the tilting of the back of the chair. The larger the casters are, the more pronounced this tilting will be. Casters used on an office chair, as described above, are much smaller than those that would be used on a wheelbarrow because of the nature of the surface that a wheelbarrow is often used on, e.g., dirt, unsmooth surfaces, etc.

If the hinged braking mechanism of this invention is installed as shown in FIG. 4 of the disclosure, it wouldn't take a great deal of backward motion of the wheelbarrow (such as from throwing an object into it, rather than gently lying it in place) for the brakes to be jarred out of the locked position—especially since the brake is already biased towards the unlocked position by the coil spring 64 shown in that disclosure.

A second invention using two rear wheels and a gravity operated parking brake is U.S. Pat. No. 4,767,128 to Terhune, issued Aug. 30, 1988. This invention also discloses the use of large swivel casters for the two rear wheels. The invention doesn't teach whether the swivel casters have offset or straight spindles. If the casters are offset, they will contribute to the problem of the wheelbarrow tipping over as was described in the Garcia invention mentioned above. If the swivel casters are straight, the wheelbarrow would be practically impossible to steer if it were riding on its two rear wheels or on all three wheels. This is because straight swivel casters have no "trailing" ability unless some mechanical embodiments, not shown in this invention, are added to cause the casters to point in the desired direction.

It is possible to lock the brakes on this wheelbarrow in the disengaged position, which could cause the wheelbarrow to run away on its own down an incline should the user forget to put the brakes in the engaged position.

A third invention is shown in U.S. Patent Office Publication No. 2003/0015852 A1, published Jan. 23, 2003. That invention, which is the product of this inventor, discloses a wheelbarrow with dual rear wheels and a parking brake. The brakes on this wheelbarrow can be locked in either the "On" the "Off" state. It does not provide for the brakes to default to the "On" state if the user forgets to consciously lock them. This invention is currently still being prosecuted under a Request For Continued Examination.

SUMMARY OF THE PRESENT INVENTION

In view of the foregoing short comings inherent in the design of the braking systems of the known wheelbarrows cited above, the present braking system lends itself to providing a safer, more efficient method of controlling the movement of a wheelbarrow. It incorporates a brake that is biased in the "On" position, so that a user has to deliberately set the brakes in the "Off" position by continually squeezing a brake release lever. When the user quits squeezing the brake release lever, the brakes automatically revert to the default "On" position. This eliminates the chances of a wheelbarrow equipped with the present braking system from inadvertently running away down an incline on its own. My present braking system has a brake release lever located inside a handle upright attached to at least one of a wheelbarrow's handles near the handle's gripping end. Locating the release lever in this position enables a user to control movement of the wheelbarrow by using the uprights and selectively applying or removing an upward force to the brake release lever, which enables the user to release the brakes while using the wheelbarrow to traverse obstacles in the wheelbarrow's path more efficiently or moving the wheelbarrow on all of its wheels, as will be described in more detail later in this specification.

OBJECTS AND ADVANTAGES

To attain the advantages stated in the foregoing summary, the present braking system incorporates and utilizes features that increase the operational efficiency and safety of wheelbarrows incorporating it over conventional wheelbarrows. Advantageous features of example forms of the present braking system include new methods of using a wheelbarrow equipped with this braking system. A wheelbarrow equipped with my new braking system enables its user to traverse obstacles more efficiently with it than is possible with a conventional wheelbarrow. A wheelbarrow equipped with my present braking system also enables a user to haul a heavier load than can be hauled by a strut-fitted wheelbarrow. A wheelbarrow using the present braking system enables it to sit on an inclined surface without coasting on its own, although it rests solely on wheels, a condition attributed to the present braking system's ability to automatically default to the "On" position unless a user deliberately unlocks the brakes by continuously applying a force to a lever that releases the brakes.

The present braking system has a brake release lever that is conveniently located for ease of operator access and use, since the release lever is attached to a handle upright attached to the rearward portion of a wheelbarrow handle. Incorporating these handle uprights also reduces the amount of bending over that a user would experience when using a wheelbarrow equipped with the present braking system in the manner that will be described later in this specification.

An example form of the present braking system is a wheel-fitted assembly that can easily replace the strut assemblies currently used on conventional wheelbarrows, for example, it could be made as a retrofit kit or as a component of original equipment. Another example aspect of the present braking system is that it can be easily developed and built at low cost by those currently manufacturing conventional wheelbarrows, and can be marketed by a manufacturer of conventional wheelbarrows to its existing distribution channels with its existing sales force. Still further features and advantages of the present brake system will become apparent from a consideration of the ensuing descriptions and drawings.

DRAWINGS

DETAILED DESCRIPTION OF THE EXAMPLE EMBODIMENT

Figure 1:
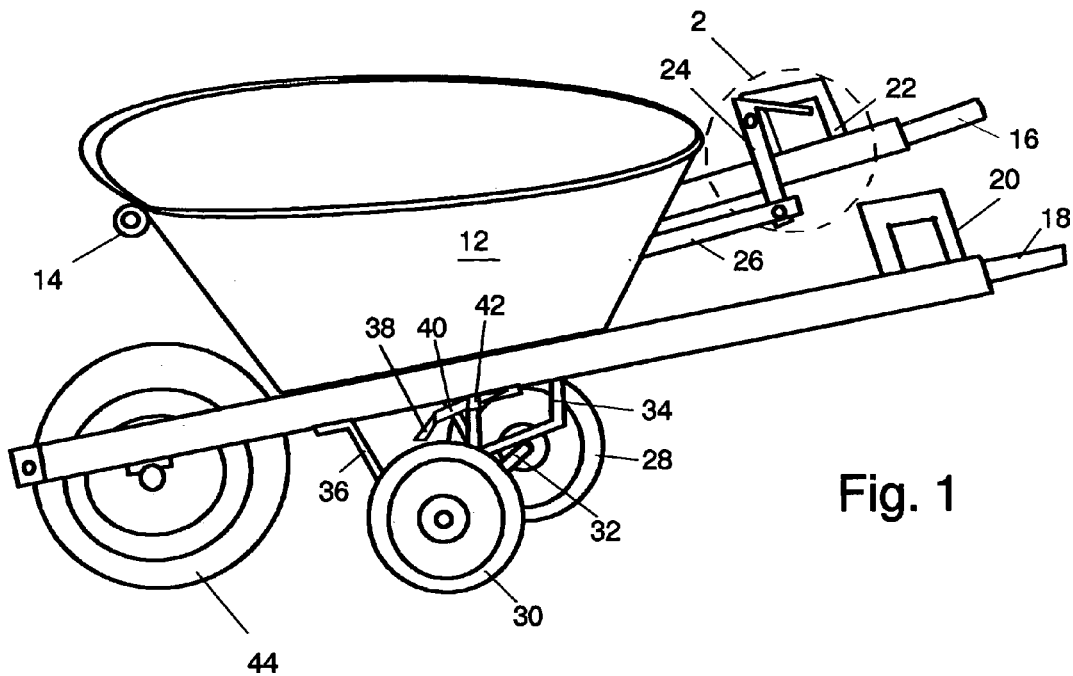
FIG. 1 is a perspective view, from its left side, of an example wheelbarrow employing my present braking system.

FIG. 1 is a view of the left side of a wheelbarrow employing the present braking system, labeling components of the present braking system, along with labeling of components common to conventional wheelbarrows that are instrumental to the exploitation of the new advantages of this new brake system. An optional pulling ring 14 is attached to the upper portion of the front of a cargo receptacle 12. Attaching pulling ring 14 to the upper portion of receptacle 12 enables someone to pull the wheel-barrow with something like a short rope, chain or cable while someone else uses a set of handles 16 and 18 or a set of handle uprights 20 and 22 to push and guide the wheelbarrow in situations in which a heavy load has to be transported, or the wheel-barrow and its cargo has to be moved up a steep incline. Locating pulling ring 14 at the upper level of receptacle 12 reduces the chance of the front of the wheelbarrow "kicking up" when tension is applied to pulling ring 14 which could be the case if someone tried to pull the wheelbarrow by applying tension to some lower part of the front of the wheelbarrow, such with a low-mounted hitch attached to a vehicle such as a garden tractor.

To enable a wheelbarrow equipped with the present braking system to be used in the "push-pull" manner just described, two rear wheels 28 and 30 are rotationally installed on a rear wheel shaft 32 to work in conjunction with at least one front wheel 44 to provide support for the wheelbarrow and its load when it sits at rest unsupported by a user. Rear wheel shaft 32 is rigidly attached to a set of rear wheel brackets 34 and 36 which also serve to mount a brake shaft 40 to which a brake shoe or pad 38 is rigidly attached to each of its ends. Rear wheel shaft 32 is mounted so that it is in a plane that is perpendicular to the longitudinal centerline of the wheelbarrow. Brake shaft 40 is rotationally attached to at least one of wheel brackets 34 and 36 by at least one bushing 42 rigidly mounted to at least one of wheel brackets 34 and 36. A brake release lever 24 is pivotally attached to right handle upright 22. A section 2 has been circled to define a sectional area that has been enlarged in FIG. 2 showing how a brake release link 26 is attached to brake release lever 24.

Figure 2:
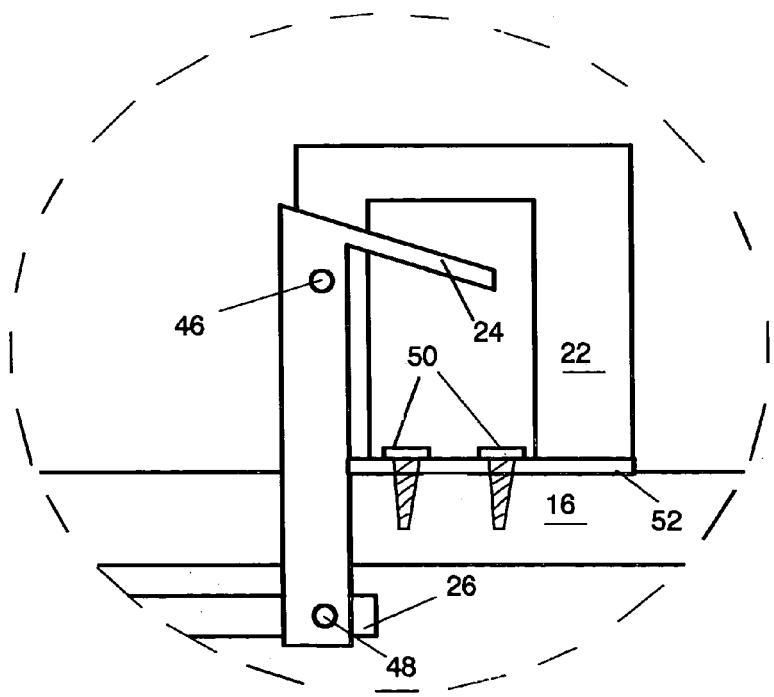
FIG. 2 is an enlarged view of a handle upright of an example wheelbarrow, as shown in FIG. 1, showing some components of the brake release mechanism of the present brake system.

FIG. 2 is an enlarged view showing how brake release lever 24 is attached to right handle upright 22 using a brake lever pivot stud 46. Brake release lever 24 is pivotably attached to brake release link 26 using a brake link pivot stud 48. Handle upright 22 is rigidly affixed to an upright mounting plate 52 which is affixed to handle 16 through using a pair of upright mounting screws 50 or other connecting methods.

Figure 3:
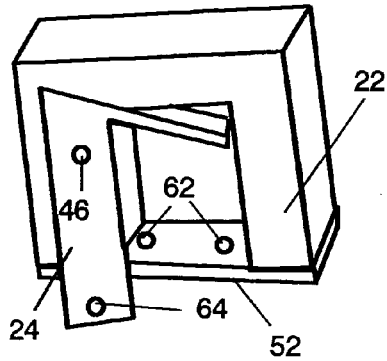
FIGS. 3 and 4 are isometric views of the two handle uprights of an example wheelbarrow employing the present brake system partly showing the three-dimensional aspects of the handles' design.

FIG. 3 shows the the three-dimensional aspects of the right handle upright 22 of a wheelbarrow employing the present braking system and how brake release lever 24 is pivotably mounted within it using brake lever pivot stud 46. This design limits both the clockwise and the counterclockwise rotation of lever 24 around pivot stud 46 as will be discussed in further detail below. A brake link pivot hole 64 is for mounting brake link 26 (FIG. 2) and a plurality of upright mounting plate holes 62 receive screws 50 (FIG. 2) to mount upright mounting plate 52. The handle uprights 22 and (20 shown in FIG. 4) are generally inverted "U-shaped" elements having first and second upright portions 201 and 202, respectively, mounted mounted securely to handles 16 and 18 (FIG. 1) at spaced-apart locations, and a handgrip portion 203 extending between the upright portions.

Figure 4:
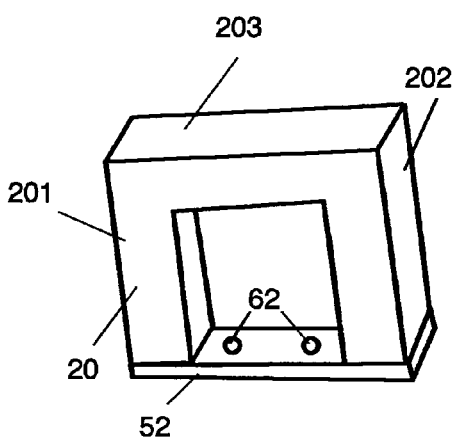

FIG. 4 shows left handle upright 20 and how it has the same mounting plate 52 and mounting holes 62 as right upright 22 shown in FIG. 3.

Figure 5:
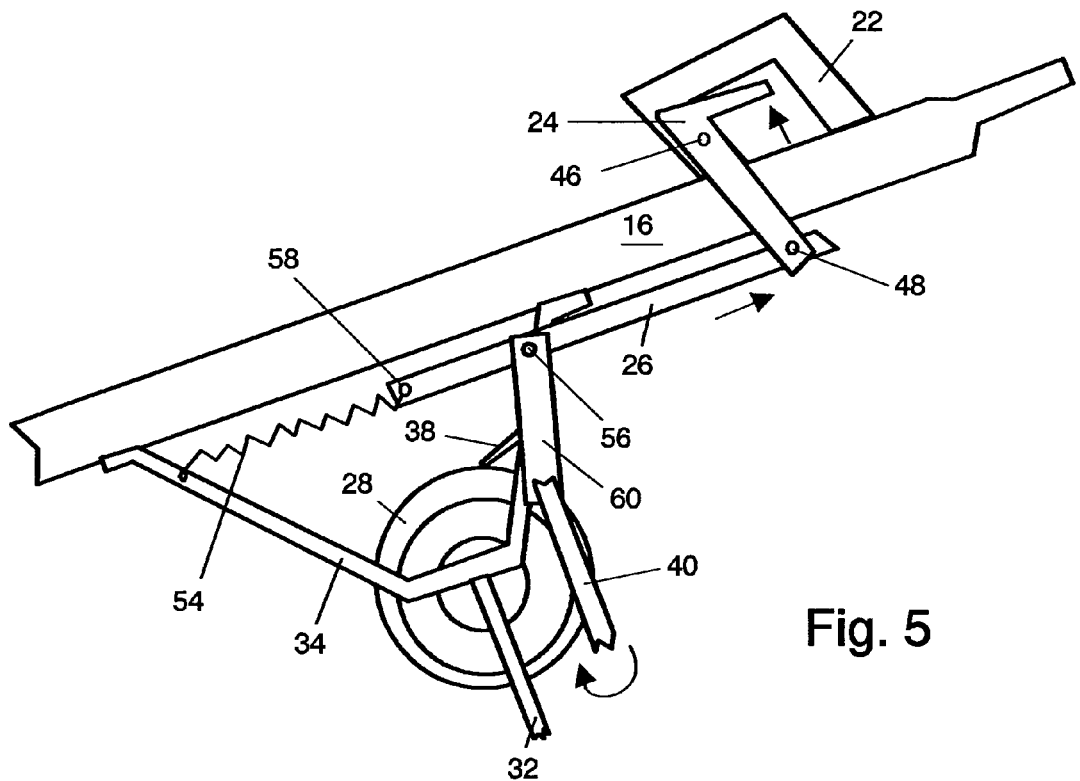
FIG. 5 is a partial view of a wheelbarrow employing the present braking system to aid in understanding the direction of component movement and application of forces to effect braking action.

FIG. 5 shows components associated with an example form of a braking system for a wheelbarrow according to the present invention. When the wheelbarrow is sitting at rest, its brake is automatically set in the "Locked" position by brake shoe 38 which is forced against the tread of rear tire 28. To achieve this, brake shaft 40 which has the vane-like brake shoe 38 rigidly affixed to it is rotated within its bushings 42 (FIG. 1) by a brake bellcrank 60 to bring shoe 38 into contact with tire 28. Rotation of shaft 40 in the desired direction to keep tire 28 locked is accomplished by having bellcrank 60 rigidly affixed to shaft 40 then pivoting bellcrank 60 with linear movement of brake release link 26 which is pivotally attached to bellcrank 60 with a brake bellcrank pivot stud 56.

Release link 26 is also operably attached to a brake tension spring 54 which is attached to an upright portion of right rear wheel bracket 34 and a brake spring anchor 58 located in the distal end of link 26. The force of tension spring 54 pulls release link 26 to the left. Since release link 26 is pivotally connected to bellcrank 60 by pivot stud 56 the linear motion of link 26 to the left causes counter-clockwise rotation of bellcrank 60 which in turn causes shaft 40 to move brake shoe 38 into the tread of tire 28. This is a sturdy braking method, because the position of wheel 28 is fixed in relation to bracket 34 by its positioning on rear wheel shaft 32 which is rigidly fixed to bracket 34. Since brake shoe 38 is also fixed on bracket 34 there is no flexing that could change the positional relationship between brake shoe 38 and tire 28. This braking method also compensates for wear of the tread of tire 28 and the fact that the diameter of tires of this type can vary considerably due to their diametric tolerances. The force of tension spring 54 will automatically cause brake shoe 38 to "dig" into tire 28 until it finds the point of maximum braking that the force of tension spring 54 can provide.

What has just been described is how the present braking system is kept in the locked position when installed on a wheelbarrow. Here's how to unlock the brakes on the present braking system so that wheel 28 can be made to rotate freely: Right handle upright 22 is mounted to right handle 16 within convenient reach of a user. According to the parameters that I used earlier in this specification describing the type of wheelbarrow my new braking system applies to, it doesn't appear that a foot-operated braking system would lend itself to being used in the manner that I will describe later for my new method of using a wheelbarrow equipped with my new braking system, in great part due to the location of the gripping ends of the wheelbarrow's handles in relation to where the rear wheels of the wheelbarrow rest on a surface. It would appear quite akward for a user to operate a foot actuated brake while stooping down and extending his or her leg out at least three feet in order to operate such a brake on a wheelbarrow. A user desiring to unlock the brakes on my present wheel- barrow braking system does so by applying, according to the arrow, an upward gripping force to the tang of brake release lever 24 which causes it to rotate counter-clockwise around brake lever pivot stud 46. This causes release lever 24 to move brake link pivot stud 48 to the right, which moves release link 26 accordingly, as shown by the arrow. The motion is transferred to bellcrank 60 which rotates shaft 40 clockwise as shown by the arrow. This pivots brake shoe 38 away from the tread of tire 28.

When the user removes the upward force from release lever 24 the brake system is restored to the locked state by the force of tension spring 54. Throughout this operation, the upward travel of release lever 24 is stopped when its tang contacts the lower surface of the gripping portion of handle upright 22. Travel of release lever 24 in the opposite direction is stopped when brake shoe 38 digs into tire 28 to the maximum extent that the force of tension spring 54 will permit.

Operation of the Present Brake System

There are several methods of using the present braking system to enhance the utility of a wheelbarrow on which it is installed. I will briefly describe examples: A wheelbarrow using my present braking system may be used in the same manner as one would use a conventional wheelbarrow by operating it using its two handles 16 and 18 to push it or pull it and guide it with it riding on its front wheel(s) 44. In this method of operation, rear wheels 28 and 30 are in the default "Locked" position, so those wheels would serve the same purpose as struts on a conventional wheelbarrow. A user would use the wheelbarrow by this method when parking it for loading or unloading its cargo receptacle 12. This default "Locked" state is also helpful for situations in which there is an awareness of a user being prone to forget to lock the brakes or situations in which children may have access to the wheelbarrow and decide to use it as a wheeled toy and try to ride it down an incline.

When there is a need to use a wheelbarrow equipped with the present braking system to traverse obstructions, such as curbs, steps, logs, etc., in its path of travel, one could operate the wheelbarrow using handle uprights 20 and 22 to move it. A user could roll the wheelbarrow up to the obstruction, then squeeze brake release lever 24 located inside right handle upright 22. This releases the brakes so that rear wheels 28 and 30 are free to rotate. The user would then push down on handle uprights 20 and 22 causing front wheel(s) 44 to raise to a level above the obstruction. Push the wheelbarrow forward with it riding on its rear wheels 28 and 30 serving as a rolling fulcrum until front wheels 44 get past the obstruction. Allow front wheel(s) 44 to settle back down to the surface then continue moving the wheelbarrow by applying force to either its handle uprights 20 and 22 or to its handles 16 and 18.

When using a wheelbarrow incorporating my present braking system in tight quarters, such as turning in a cramped corner, use handle uprights 20 and 22 to move and steer the wheelbarrow. That method is superior to that of "choking-up" on the handles as when using a conventional wheelbarrow. Such "choking-up" often leads to spilled loads, because the more a user chokes up on the handles, the further the cargo receptacle is going to be caused to tip forward. When using handle uprights 20 and 22 on wheelbarrows equipped with my present braking system, the height of handle uprights 20 and 22 alone will reduce the amount that the wheelbarrow tips forward because there is no need to lift the rear of the wheelbarrow as high.

When using a wheelbarrow equipped with my present braking system to carry an extra heavy load, such as one that would exceed the load capacity of a front wheelbarrow tire, use this wheelbarrow with it riding on all of its wheels. Do that by pushing it using handle uprights 20 and 22 and squeezing brake release lever 24 so that rear wheels 28 and 30 rotate freely. Pulling ring 14 may also be used in this situation. One user could attach a short rope, cable or chain, etc., to pulling ring 14 and pull the wheelbarrow while another user pushes it and guides it by applying force to handle uprights 20 and 22 and squeezing brake release lever 24. Pushing the wheelbarrow by applying force to handle uprights 20 and 22 reduces stress on the user's back, because the user doesn't have to stoop down as low to grasp the uprights 20 and 22. This method also applys to situations in which the wheelbarrow is being used to move a load up a steep incline.

The significance of pulling ring 14 when used on a wheelbarrow employing my present braking system has to do with where it is positioned on the wheelbarrow. Attaching a pulling chain, cable, rope, etc., to the front handle guard of a conventional wheelbarrow would apply force at such a low position on the wheelbarrow as to make the wheelbarrow susceptible to "tipping-up" when tension is applied to the guards by anything other than some device with a low hitch such as a garden tractor. Locating pulling ring 14 at the upper level of the front of a wheelbarrow using my present braking system reduces the chancees of this "tipping-up" when the wheelbarrow is pulled manually.

CONCLUSION

Accordingly, one can see that there are significant advantages to replacing the rear struts found on conventional wheelbarrows with widely spaced, relatively large diameter wheels. A wheelbarrow design incorporating my new braking system, along with my new method of use not only facilitates the user's ability to traverse obstructions with the wheelbarrow, it also increases both the load bearing capacity as well as the load carrying capacity of the wheelbarrow Those who are familiar with using conventional wheelbarrows will readily see that the present wheelbarrow enables its user to transport heavy loads in a manner that would be virtually impossible for a user to transport using a conventional wheelbarrow. The optional incorporation of an upper-mounted pulling ring on a wheelbarrow equipped with the present braking system would allow one user to pull the wheelbarrow while another person uses the handles or handle uprights to push it and guide it. A brake system designed for a wheelbarrow that can rest exclusively on wheels should, for safety reasons, be capable of defaulting to the "On" state as is the case with the present brake system.

Development, manufacturing and distribution costs are important, because of the impact that they ultimately have on the price of the product to the consumer. Those costs have been minimized in designing the present braking system by dimensioning it so that it is compatable with many of the components of conventional wheelbarrows currently being manufactured. Close scrutiny by one skilled in the art would reveal that the design and manufacturing changes needed to modify a conventional wheel- barrow to incorporate my present braking system are not of such an extent as to greatly increase their manufacturing costs. Further, the present braking system can be installed by the existing employees of a manufacturer of conventional wheelbarrows with very little training and it can be installed on the same assembly line that the manufacturer already has in place. A manufacturer that currently builds conventional wheelbarrows could easily incorporate wheelbarrows employing my present braking system into its offerings and market it through its current distribution channels with its existing sales force. All of these considerations give the manufacturer the ability to expand its consumer offerings by offering wheelbarrows incorporating my present braking system into its product line at minimal cost.

It will be understood that while the form of the invention herein shown and described constitute an example embodiment of the invention, it is not intended to illustrate all possible forms of the invention. It will also be understood that the words used throughout this application are words of description rather than words of limitation and that various changes may be made without departing from the spirit and scope of the invention herein disclosed and claimed.

What is claimed is:

1. A braking system for a wheelbarrow of the type including a cargo receptacle having a front end, a rear end, two sides and an underside, at least two spaced handles connected to the underside of said cargo receptacle and extending both forward and rearward of said cargo receptacle, at least one front wheel having an axis and rotationally mounted to a forward extension of said at least two spaced handles adjacent said front end of said cargo receptacle, a rear wheel shaft with a length and two exterior ends, said rear wheel shaft being laterally mounted and rigidly attached to two rear wheel brackets, each rear wheel bracket being generally "U" shaped, having a top, a bottom, an interior side, an exterior side and an upright portion, one of each of said two rear wheel brackets installed on the underside and towards the rear of each of said two sides of said cargo receptacle, the length of said rear wheel shaft being sufficient to have each of its exterior ends extend far enough beyond the exterior side of each of said two rear wheel brackets to accommodate the mounting of each of two rear wheels, one of each rear wheel rotationally mounted to each exterior end of said rear wheel shaft, said braking system comprising;

at least one brake pad biased, without aid of the mass of the wheelbarrow and its cargo load, towards engagement with an outer surface of a tire of at least one of said two rear wheels to resist rotation thereof; and at least one brake tension spring having a first end connected to a brake release link and an opposite second end directly connected to one of said two rear wheel brackets for biasing said braking system to a braked position wherein said at least one brake pad is in engagement with at least one of said two rear wheels; and two handle uprights, one of each mounted adjacent a rearward end of each of said at least two spaced handles, each handle upright having a generally inverted "U" shape comprising spaced apart upright portions with a handgrip portion handgrip portion between said spaced apart upright portions to form a cavity; and a brake release lever pivotally mounted within the cavity of at least one of said two handle uprights with a brake lever pivot stud attaching said brake release lever to one of the spaced apart upright portions of at least one of the handle uprights; and a brake link pivot stud pivotally connecting said brake release lever to the brake release link that is pivotally connected to a brake bellcrank, said brake bellcrank being rigidly affixed to a brake shaft rigidly attached to at least one of said at least one brake pad and rotatable within at least one bushing rigidly attached to the upright portion of at least one of said at least two rear wheel brackets.

2. The braking system of claim 1, wherein said brake release lever is movable between a first position and a second position to overcome the tension of said at least one brake tension spring and move said at least one brake pad out of engagement with said at least one of said two rear wheels; wherein said wheelbarrow employing said braking system may be moved while it is riding on only its said two rear wheels, using the two rear wheels as a rolling fulcrum and the two spaced apart handles as levers.

3. The braking system of claim 1, wherein said brake release lever is movable between a first position and a second position to overcome the tension of said at least one brake tension spring and move said at least one brake pad out of engagement with said at least one of said two rear wheels; wherein said wheelbarrow employing said braking system may be moved while it is simultaneously riding on its at least one front wheel and its two rear wheels while it is being propelled.

* * * * *